United States Patent [19]
Satake et al.

[11] Patent Number: 5,848,311
[45] Date of Patent: Dec. 8, 1998

[54] FILM PRESSURE PLATE OF A CAMERA FOR USE WITH A FILM HAVING A MAGNETIC RECORDING PORTION

[75] Inventors: Hiroyuki Satake, Musashino; Hidenori Sakurai, Hachioji, both of Japan

[73] Assignee: Olympus Optical Co., Ltd, Shibuya-Ku, Japan

[21] Appl. No.: 799,640

[22] Filed: Feb. 10, 1997

[30] Foreign Application Priority Data

Feb. 15, 1996 [JP] Japan ................................. 8-027980

[51] Int. Cl.⁶ ............................. G03B 17/24; G03B 17/00
[52] U.S. Cl. ............................................ 396/440; 396/319
[58] Field of Search .................................... 396/319, 320, 396/440, 441, 442; 352/27, 224, 225, 227

[56] References Cited

U.S. PATENT DOCUMENTS

| | | | |
|---|---|---|---|
| 4,860,037 | 8/1989 | Harvey | 354/21 |
| 4,996,546 | 2/1991 | Pagano et al. | 396/319 |
| 5,097,278 | 3/1992 | Tamamura et al. | 396/440 |
| 5,136,318 | 8/1992 | Aoshima | 396/320 |
| 5,257,054 | 10/1993 | Kameyama | 396/442 |
| 5,353,078 | 10/1994 | Aoshima | 396/320 |
| 5,508,768 | 4/1996 | Wakabayashi et al. | 396/319 |
| 5,517,266 | 5/1996 | Funaki et al. | 396/319 |
| 5,555,045 | 9/1996 | Tsujimoto et al. | 396/320 |

FOREIGN PATENT DOCUMENTS 58-163939 U 11/1983 Japan .
3264934A 11/1991 Japan .

*Primary Examiner*—A. A. Mathews
*Attorney, Agent, or Firm*—Kenyon & Kenyon

[57] ABSTRACT

An improved film pressure plate of a camera for use with a film having a magnetic recording portion is provided. The film pressure plate comprises a magnetic head for recording magnetic information onto the magnetic recording portion of the film and a film contact surface which may include a plurality of small projections formed on a portion of a surface of the film pressure plate. The projections are not provided on at least one of a lengthwise elongated area, which includes the magnetic head, and a widthways elongated area, which may also include the magnetic head. As a consequence of this arrangement, a flatness of the film is assured by pressing the film against the exposure aperture of the camera.

9 Claims, 3 Drawing Sheets

FILM PRESSURE PLATE OF A CAMERA FOR USE WITH A FILM HAVING A MAGNETIC RECORDING PORTION

BACKGROUND OF THE INVENTION

1. Field of the Invention

The present invention relates generally to a film pressure plate of a camera, and more particularly to a film pressure plate of a camera having a magnetic head for recording information onto a film which has a magnetic recording track thereon.

2. Description of the Related Art

U.S. Pat. No. 4,660,037 discloses a camera which utilizes a film having a magnetic recording portion thereon and which writes photographic information onto the magnetic recording portion of the film. Japanese unexamined Patent Publication hei 3-264934 discloses a film pressure plate of a camera for assuring the flatness of a film located at an exposure aperture of the camera. The pressure plate has a magnetic head for writing information onto the magnetic recording portion of the film; the magnetic head is made to touch the magnetic recording portion of the film. Japanese Utility Model Publication sho 58-163939 discloses a film pressure plate of a camera which has a plurality of small projections on a film contact surface of the pressure plate so as to prevent the film from clinging to the pressure plate and from being scratched, and to reduce a film feed friction between the film and the pressure plate.

In general, a magnetic head and a recording portion of a film should be kept in good contact with each other in order to achieve successful magnetic recording. However, each of the above-mentioned references does not refer to an effect of clinging dusts on the magnetic head, so that some difficulty may occur due to dust clinging to the magnetic head as a result of the friction between the film and the film pressure plate. For example, if there are some small projections in a film passageway elongated in a longitudinal or a widthways direction on a film contact surface of the film pressure plate, then shaved scraps from the projections on the film pressure plate may be generated, and such scraps may cling to a gap portion of the magnetic head, so that some recording error may occur due to the poor head touch condition.

SUMMARY OF THE INVENTION

The first object of the present invention is to provide an improved film pressure plate of a camera for use with a film which has a magnetic recording portion. The film pressure plate prevents shaved scraps of the film pressure plate from clinging to a magnetic head mounted thereon so as to achieve successful magnetic recording.

The objects and features of the present invention will be better understood by the description of the preferred embodiments as given below.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Preferred embodiments of the present invention will be described below with reference to the accompanying drawings.

Figure 1:
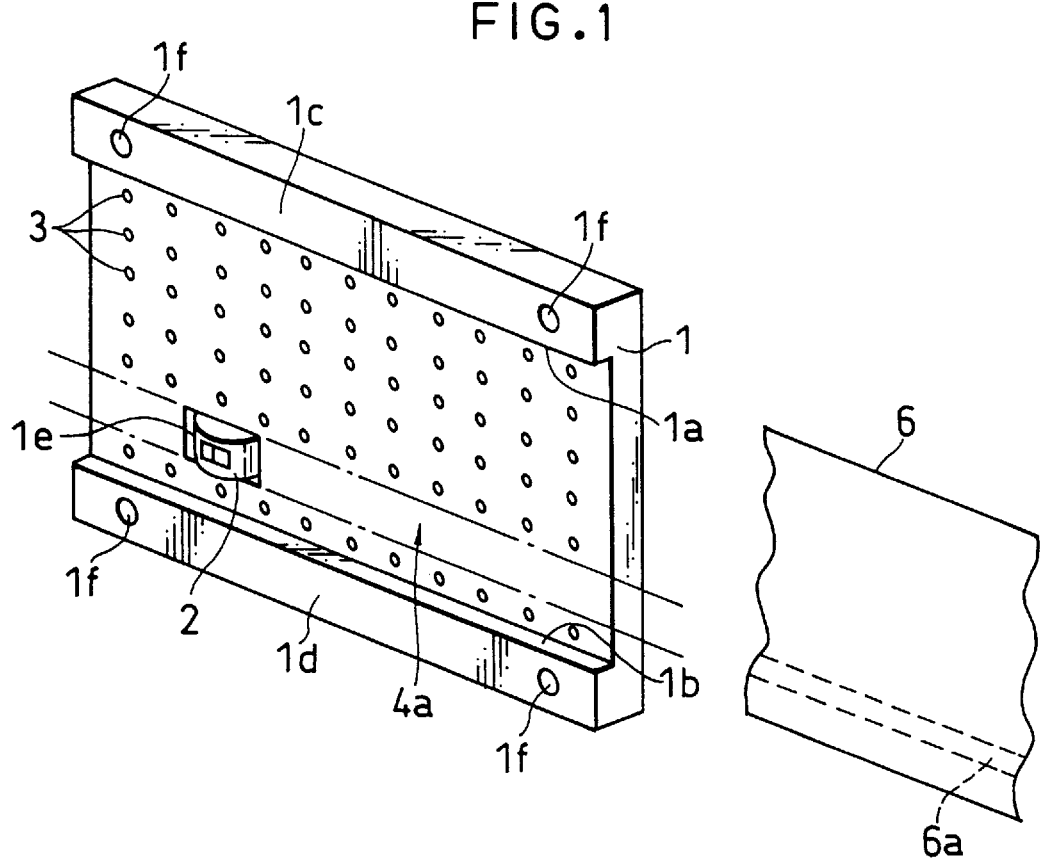
FIG. 1 illustrates a perspective view of a film pressure plate of the first embodiment.
Figure 2:
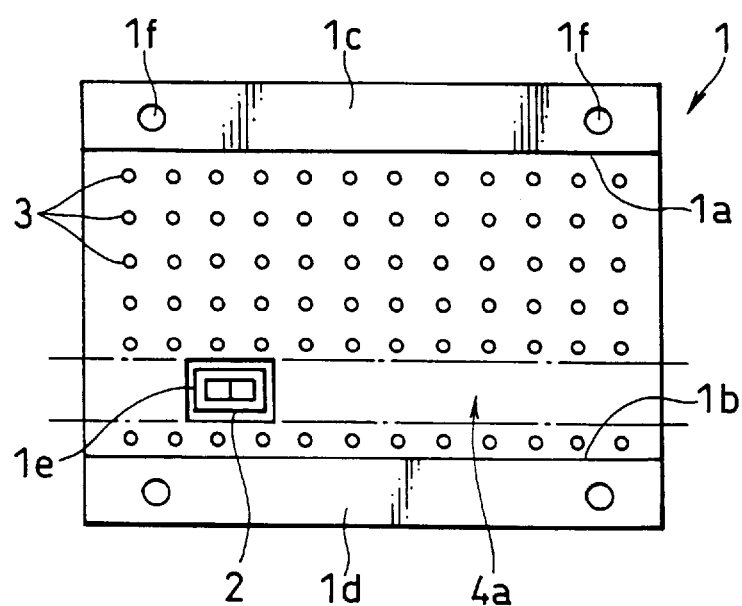
FIG. 2 illustrates a plan view of the film pressure plate of the first embodiment.
Figure 3:
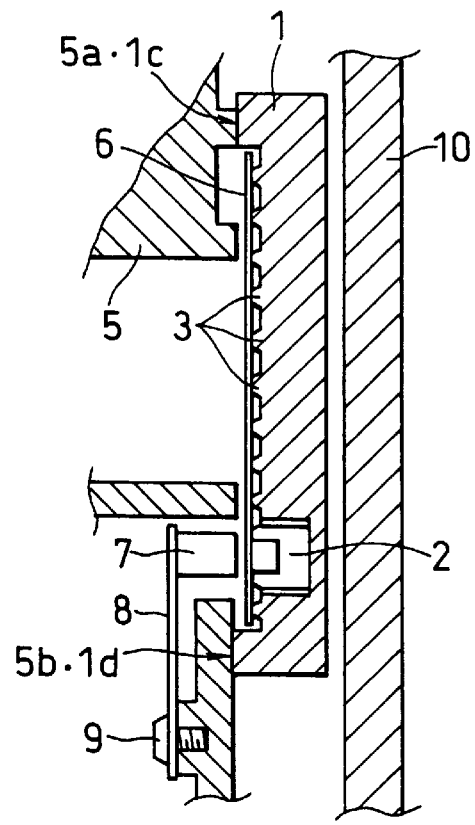
FIG. 3 illustrates a sectional view of a film exposing aperture of a camera according to the first embodiment.

FIGS. 1–3 respectively illustrate a perspective view of a film pressure plate, a plan view of the film pressure plate, and a sectional view of a film exposing aperture of the camera of the first embodiment. The film pressure plate is located in a film passageway of the cameras. The film pressure plate assures a sufficient flatness of the film by pressing a back surface of the film against a main body of the camera as shown in FIG. 3.

In FIG. 1, both a top rail surface 1c and a bottom rail surface 1d of the film pressure plate 1 are formed thicker than the portion of film pressure plate 1 that lies between the top and bottom rail surface 1c and 1d, so that wall portions 1a and 1b regulate the film passageway in a direction perpendicular to an optical axis of the camera. Both rail surfaces 1c and 1d regulate the film passageway in a direction in parallel to the optical axis of the camera. The rail surfaces 1c and 1d are made to contact another respective rail surfaces 5a and 5b, which are provided on the camera body 5, as shown in FIG. 3. As a result, the film passageway is so formed by contacting the rail surfaces 5a–1c and 5b–1d to each other. As a consequence, the film 6 will be transported while being regulated in its position in both the horizontal and vertical directions in FIG. 3.

A magnetic head 2 is attached to the film pressure plate 1 through a rectangular bore 1e which is located at a position where the magnetic head 2 is able to touch a magnetic recording portion 6a of the film 6. The film pressure plate 1 is attached to the main body 5 of the camera by using four screws (not shown) through four screw bores 1f, as shown in FIG. 1. [A] As illustrated in FIG. 3, a pad member 7 for pressing the film 6 against the magnetic head 2 is attached to the main body 5 of the camera via an elastic member 8 which is fastened to the main body by a screw 9. The pad member 7 is located at a position where it faces the magnetic head 2 via the film 6. Reference numeral 10 denotes an exterior member of the camera.

In the first embodiment, hemisphere shaped small projections 3 are arranged periodically on the film contact surface of the film pressure plate 1 except for a lengthwise elongated area 4a that includes the rectangular bore 1e. Namely, the hemisphere shaped projections 3 are formed on the film contact surface of the film pressure plate 1, except for a lengthwise elongated area 4a that is parallel to the film transport direction, so that the magnetic recording portion 6a of the film 6 does not touch the projections 3, but instead touches the magnetic head 2. As a result, the amount of shaved scraps that cling to the magnetic head 2 from the projections 3 will be greatly reduced, so that a poor head touch condition due to clinging shaved scraps from the projections 3 to the magnetic head 2 is prevented from occurring. As the head touch status is kept in good condition, highly reliable magnetic recording can be successfully carried out.

Figure 4:
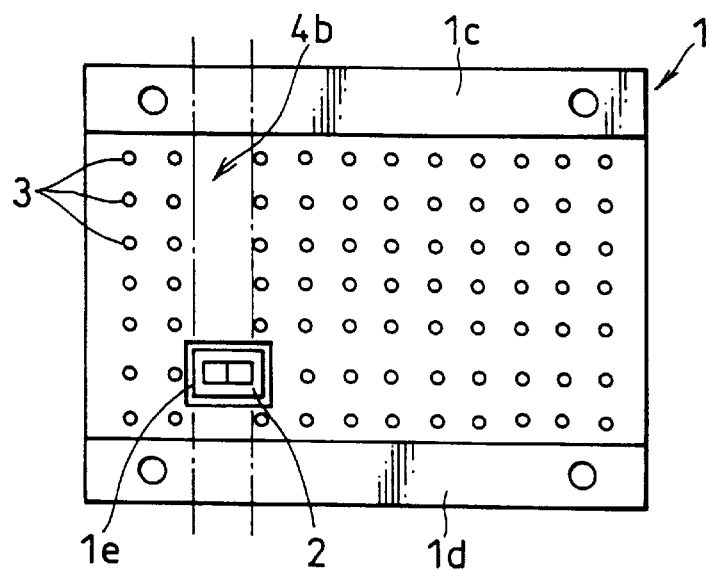
FIG. 4 illustrates a plan view of a film pressure plate of the second embodiment.

FIG. 4 illustrates a plan view of a film pressure plate 1 of a camera for use with a film 6 having a magnetic recording portion 6a in accordance with the second embodiment. In the second embodiment an arrangement scheme of the hemisphere shaped projections 3 is changed compared with the first embodiment. All construction elements other than the arrangement of the projections 3 are the same as the first embodiment, so that descriptions for those same elements are omitted.

In the second embodiment, hemisphere shaped small projections 3 are provided periodically on a film contact surface of a film pressure plate 1 as in the first embodiment. In the second embodiment, however, the hemisphere shaped projections 3 are arranged on the film contact surface of the film pressure plate except for a widthways elongated area 4b that is perpendicular to the film transport direction. Namely, the hemisphere shaped projections 3 are formed on the film contact surface of the film pressure plate 1 except for an elongated area 4b that is perpendicular to the film transport direction, so that an area of the film which is facing area 4b does not contact the projections 3. As a result, the amount of shaved scraps that cling to the magnetic head 2 from the projections 3 will be greatly reduced, so that a poor head touch condition due to clinging shaved scraps from the projections 3 to the magnetic head 2 is prevented from occurring. As the head touch status is kept in good condition, highly reliable magnetic recording can be carried out.

Figure 5:
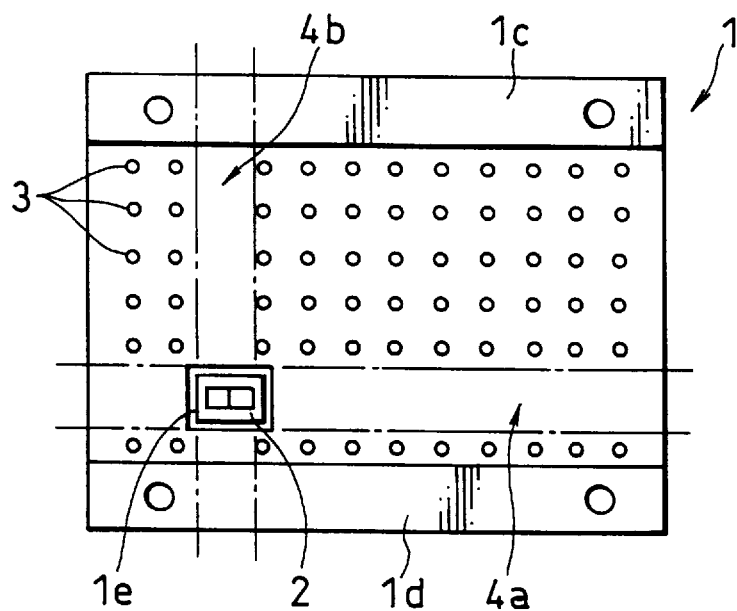
FIG. 5 illustrates a plan view of a film pressure plate of the third embodiment.

FIG. 5 illustrates a plan view of a film pressure plate 1 of a camera for use with a film 6 having a magnetic recording portion in accordance with the third embodiment. In the third embodiment, an arrangement scheme of the hemisphere shaped projections 3 is changed in comparison with the first embodiment. All construction elements other than the arrangement of the projections 3 are the same as the first embodiment, so that descriptions for those same elements are omitted.

In the third embodiment, hemisphere shaped small projections 3 are provided periodically on a film contact surface of a film pressure plate 1 like the first embodiment. In the third embodiment, however, the hemisphere shaped projections are arranged on the film contact surface except for both a lengthwise elongated area 4a that is parallel to the film transport direction and a widthways elongated area 4b that is perpendicular to the film transport direction. As a result, the areas of the film surface which face arms 4a and 4b do not contact the projections 3. Consequently, the amount of shaved scraps that cling to the magnetic head 2 from the projections 3 will be greatly reduced, so that a poor head touch condition due to clinging shaved scraps from the projections 3 to the magnetic head 2 is prevented from occurring. As the head touch status is kept in good condition, highly reliable magnetic recording can be carried out.

Figure 6:
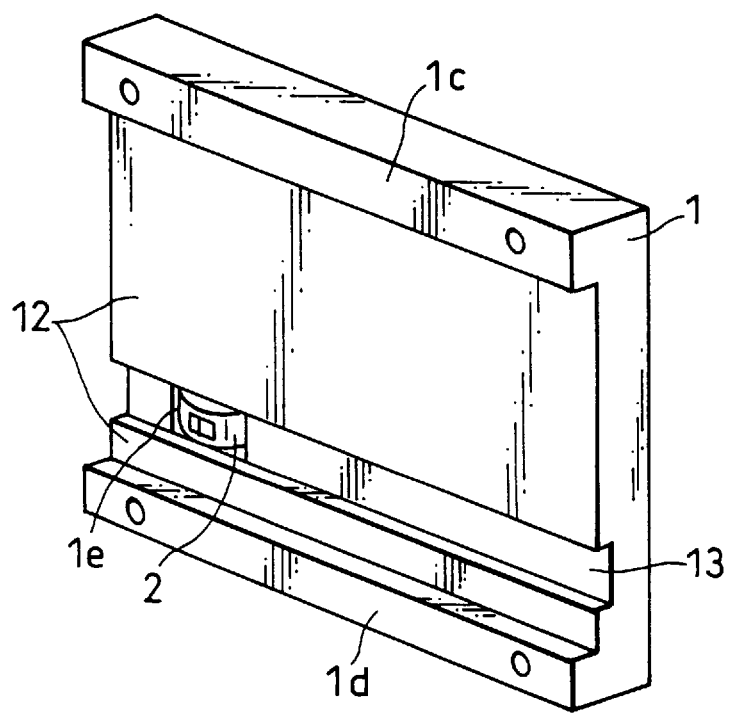
FIG. 6 illustrates a perspective view of a film pressure plate of the fourth embodiment.

FIG. 6 illustrates a perspective view of a film pressure plate 1 of a camera for use with a film having a magnetic recording portion in accordance with the fourth embodiment. In the fourth embodiment a film contact surface is formed in a plane instead of as hemisphere shaped projections 3, as discussed in the first through third embodiments. All construction elements other than the form of the pressure plate 1 are the same as the first embodiment, so that descriptions for those same elements are omitted.

In the fourth embodiment, there is provided a contact plane 12 for assuring a projection amount of the magnetic mead 2 and flatness of the film 6 at a film exposing aperture on a film contact surface 12 of the film pressure plate 1. There is also provided a film non-contact surface 13 which is a recessed area including the bore 1e and which is elongated in parallel to the film transport direction. In the fourth embodiment, the recessed area 13 is limited to substantially the same width as the width of the bore 1e, and the recessed area 13 is elongated in parallel to the film transport direction. However, the recessed area 13 may also be made to lie perpendicular to the film transport direction, or the film pressure plate 1 may include a recessed area 13 that is parallel to the film transport direction and another recessed area that is perpendicular to the film transport direction. There also may be provided a slanted or a partially rounded surface within a step portion between the film contact surface 12 and the film non-contact surface 13. In the fourth embodiment, there is provided the film non-contact surface 13, which includes the bore 1e elongated in parallel to the film transport directions, and the other portion of the film pressure plate 1 comprises the film contact surface 12, so the amount of shaved scraps clinging to the magnetic head 2 from the film contact surface 12 on the film pressure plate 1 will be greatly reduced, resulting in an improved head touch condition. As the head touch status is kept in good condition highly reliable magnetic recording can be carried out.

Accordingly, all such modifications are embodied within the scope of this invention as properly within the contribution to the art and are particularly pointed out by the following claims.

What is claimed is:

1. A film pressure plate of a camera for assuring a flatness of a film located at an exposure aperture of the camera, the film having a magnetic recording portion thereon, the film pressure plate comprising:

a magnetic head for recording and reproducing information recorded on the magnetic recording portion of the film; and a film contact surface formed on a surface of the film pressure plate except for at least one of a lengthwise elongated area and a widthways elongated area including the magnetic head, the film contact surface assuring the flatness of the film by pressing the film against the exposure aperture of the camera, wherein the film contact surface is formed by a plurality of projections for contacting the film.

2. A film pressure plate of a camera for use with a film having a magnetic recording portion thereon, the camera having a magnetic head on a film contact surface of the film pressure plate, the film pressure plate comprising:

a head retainer for retaining the magnetic head on the film pressure plate; and a plurality of hemisphere shaped projections arranged on the film contact surface except for a widthways elongated area having a height the same as that of the magnetic head, the projections assuring the flatness of the film located at an exposure aperture of the camera.

3. A film pressure plate of a camera for use with a film having a magnetic recording portion, the camera having a magnetic head on a film contact surface of the film pressure plate, the film pressure plate comprising:

a head retainer for retaining the magnetic head on the film pressure plate; and a plurality of hemisphere shaped projections arranged on the film contact surface except for a lengthwise elongated area having a width the same as that of the magnetic head, the projections assuring a flatness of the film located at an exposure aperture of the camera.

4. A film pressure plate of a camera for use with a film having a magnetic recording portion, the camera having a magnetic head on a film contact surface of the film pressure plate, the film pressure plate comprising:

a head retainer for retaining the magnetic head on the film pressure plate; and a plurality of hemisphere shaped projections arranged on the film contact surface except for at least one of a widthways elongated area having a height the same as that of the magnetic head and a lengthwise elongated area having a width the same as that of the magnetic head, the projections assuring a flatness of the film located at an exposure aperture of the camera.

5. A film pressure plate of a camera for use with a film having a magnetic recording portion, the pressure plate assuring a flatness of the film by pressing a back of the film against a main body of the camera, the pressure plate comprising:

a plurality of portions defining a window for causing the magnetic head to face a film contact surface of the film pressure plate; and a film pressing surface for assuring a flatness of the film at an exposure aperture of the camera, wherein the film pressing surface extends in the film pressure plate except for an elongated area including at least the window, and wherein the film pressing surface includes a plurality of projections.

6. A film pressure plate of a camera for use with a film having a magnetic recording portion thereon, the film pressure plate comprising:

a plurality of portions defining a window for causing a magnetic head to face the magnetic recording portion of the film; and a plurality of small projections being arranged periodically in a predetermined density on a film contact surface of the film pressure plate except for a predetermined elongated area including the window, wherein the projections assure a flatness of the film, whereby a gap portion of the magnetic head is prevented from accumulating shaved scraps of at least one of the pressure plate and the film due to friction therebetween.

7. The film pressure plate according to claim 6, wherein the predetermined elongated area is an area elongated in parallel to a direction of film transport.

8. The film pressure plate according to claim 6, wherein the predetermined elongated area is an area elongated in a direction perpendicular to that of film transport.

9. The film pressure plate according to claim 6, wherein the film contact surface is defined by an envelope of tops of the plurality of small projections.

* * * * *